United States Patent
Abels et al.

[11] 3,885,204
[45] May 20, 1975

[54] DRIVE ARRANGEMENT USING ELECTRIC MOTOR WITH VARIABLE HYDRAULIC TRANSMISSION SET IN PREDETERMINED RELATIONSHIP TO MINIMIZE BATTERY DRAIN

[75] Inventors: Theodore Abels, Aschaffenburg-Nilkheim; Siegfried Püschel, Aschaffenburg, both of Germany

[73] Assignee: Linde Aktiengesellschaft, Hollriegelkreuth, Germany

[22] Filed: Apr. 26, 1973

[21] Appl. No.: 354,862

[30] Foreign Application Priority Data
Apr. 26, 1972  Germany........................... 2220570

[52] U.S. Cl. ................................................. 318/139
[51] Int. Cl. ............................................ H02p 5/06
[58] Field of Search ............... 180/65; 318/137, 356

[56] References Cited
UNITED STATES PATENTS

| | | | |
|---|---|---|---|
| 3,280,397 | 10/1966 | Bruns | 318/139 |
| 3,424,260 | 1/1969 | Stone | 180/65 |
| 3,457,487 | 7/1969 | Cooper | 318/356 |
| 3,512,072 | 5/1970 | Karazija et al. | 318/139 |
| 3,529,230 | 9/1970 | Tedd | 318/139 |
| 3,593,086 | 7/1971 | Thombs | 318/356 |
| 3,659,672 | 5/1972 | Jacobus | 318/139 |
| 3,686,549 | 8/1972 | Winebrener | 318/139 |

*Primary Examiner*—Robert K. Schaefer
*Assistant Examiner*—John J. Feldhaus
*Attorney, Agent, or Firm*—Karl F. Ross; Herbert Dubno

[57] ABSTRACT

A drive system using a shunt-wound electric motor, especially for fork-lift vehicles and the like, comprises a variable hydrostatic transmission connected between the shunt-wound electric motor and the wheels of the vehicle and provides means for varying the excitation current of the field winding of the electric motor.

22 Claims, 9 Drawing Figures

DRIVE ARRANGEMENT USING ELECTRIC MOTOR WITH VARIABLE HYDRAULIC TRANSMISSION SET IN PREDETERMINED RELATIONSHIP TO MINIMIZE BATTERY DRAIN

FIELD OF THE INVENTION

Our present invention relates to a drive system for a motor vehicle, and, more particularly, to a system in which an electric motor is connected to a stepless transmission, especially of the hydrostatic type, whose output element is connected to a driven body or load, e.g. the powered wheels of a vehicle.

BACKGROUND OF THE INVENTION

Electric drive or automotive vehicles are well known and, for the most part, the vehicle is provided with a battery which may be charged over night or otherwise during periods of nonuse of the vehicle and an electric motor connected to the battery and coupled to the driving wheels of the vehicle so as to propel the latter. While attempts have been made to use such vehicles in interurban and intraurban travel, they find their greatest utility as so-called plant vehicles where internal-combustion engines are not suitable because they generate noxious fumes and exhaust products. Plant vehicles include fork-lift trucks and like systems in which the wheels of the vehicle are driven by the motor and means is provided to operate the lifting fork or some other member.

It has also been proposed to use an electric motor to drive a hydrostatic transmission of the infinitely variable or stepless type. Such transmissions may include one or more pumps operatively connected to the electric motor and one or more hydraulic motors in fluid circuit with the pumps, the motor shafts being connected to a load. The hydrostatic transmission may be of the axial-piston type in which an axial-piston pump has a barrel rotatable about an axis and driven by the shaft, the pistons of the barrel bearing against an inclined surface so that the excursion of the piston is regulated by the degree of tilt of the control surface. The hydrostatic motors may also be of the axial-piston type.

In electric-drive systems, it is found that considerable waste of electrical energy is common since the electric motor generally draws upon the battery continuously during operations. It is known to limit this power consumption and thus increase the useful life of a battery charge, by operating the motor in a generator mode so that it is driven by the load when, for example, the vehicle is to be braked. In this case, the motor acts as a generator to produce electric current which is applied to the battery while the reaction torque serves to brake the vehicle.

OBJECTS OF THE INVENTION

It is the principal object of the present invention to provide an improved drive system using an electric motor and, especially, an improved drive system for plant-type vehicles such as fork-lift trucks.

Still another object of the invention is to increase the electrical efficiency of a drive system using an electric motor, thereby increasing the useful life of the battery charge.

SUMMARY OF THE INVENTION

These objects and others which will become apparent hereinafter are attained, in accordance with the present invention, by providing, in combination, a shunt-wound electric motor energized from an electric-current storage source (e.g. a battery) and a stepless hydrostatic transmission connected to the shaft of the electric motor and having one or more output elements operatively connected to a load or loads (preferably the driving wheels of a vehicle), and means for varying the excitation current of the field coil of the shunt-wound electric motor. Surprisingly, this arrangement allows all of the advantages of the mode-reversal of the electric motor to be maintained (i.e. allows the motor to operate as a generator to charge the battery), but also increases the overall electric efficiency of this system beyond that which is obtained simply by operating the motor as a generator.

It is true that shunt-wound electric motors have been provided heretofore with means for varying the excitation of the field windings and thereby controlling the rotation speed of the motor. It is also true to say that shunt-wound electric motors have been used in conjunction with stepless transmissions to drive the wheels of a motor vehicle. In the latter case it has not been proposed or suggested, to our knowledge, that it is possible or advantageous to control the excitation current of the shunt-wound electric motor. In fact, all control efforts with such systems have been based upon the infinite variability of the stepless transmission.

We have found, quite surprisingly, that the combination of a shunt-wound electric motor with control of the excitation current for the shunt winding, with a stepless variable and preferably hydrostatic transmission, gives results which cannot be obtained in any way with conventional shunt-wound control excitation systems or with the noncontrolled excitation systems using a variable transmission. In practice it is found that these results save electrical energy and allow the battery charge to remain effective for a longer period or permit smaller batteries to be used.

The novelty resides in the combination of a shunt-wound electric motor having a field coil connected in parallel with the armature, a source of direct current (e.g. a battery carried by the vehicle and rechargeable during periods of nonuse) connected across the motor, a continuously variable or stepless hydrostatic transmission having an input shaft connected to the shaft of the shunt-wound electric motor and an output shaft mechanically connected to a load (e.g. the driving wheels of a vehicle), and means for controlling the flow of current through the shunt-connected field winding in a continuously variable or stepless manner and selectively under the control of the vehicle operator.

Surprisingly, this arrangement leads to a substantial reduction in the overall energy consumption of the machine and in the consequent expense of providing the higher levels of electrical energy formerly required. For a given battery-charge level, therefore, the apparatus can be operated for longer periods or smaller batteries may be used if conventional operating periods are contemplated.

The effect of the control of the electric motor speed by selective regulation of the excitation current of the field winding upon a system in which the controllable shunt-wound motor is coupled to a stepless hydrostatic transmission will be appreciated more readily if the various operating characteristics of such a transmission are appreciated. The operating characteristics of the system vary, with different operating modes, vary markedly because of the nature of the hydrostatic transmission which may comprise a variable-output axial-piston pump and an axial-piston motor connected thereto as previously described. Thus, when the output shaft of the, or each, hydrostatic motor is at standstill the maximum torque is applied to the shaft assuming that the pump driven by the electric motor is fully effective, although the volumetric capacity (rate of fluid through flow) of the motor is minimal (since the volume rate of flow through the hydrostatic motor is proportional to the rotary speed of the output shaft).

As the applied torque drives the output shaft, the speed of the latter and the fluid capacity (volume rate of flow) of the hydrostatic transmission increases to a level corresponding to the maximum electric-motor output.

The torque generated by the hydrostatic transmission is restricted by the strength of the parts thereof and must be prevented from exceeding the maximum thus determined, the torque being limited by a pressure-relief valve which defines the maximum pressure in the system. In a vehicle drive arrangement, the pressure-relief valve may be effective to prevent the peripheral force at the driving wheels from markedly exceeding the road friction force and causing the wheels to slip.

Thus, when the hydrostatic transmission is operated such that fluid is bypassed through the pressure-relief valve or at such rates that slippage of the driving wheels occurs, electrical energy is consumed without producing useful work. At low-operating speeds of the motor relative to the pump shaft speed, the efficiency of the total system, as measured by the ratio of useful mechanical work to electrical energy input, is relatively low and a large part of the electrical energy input is dissipated by losses at the pump. At higher operating speeds of the pump, the friction losses of the inclined control surface and at the fluid-distribution surface are relatively high.

In another operating mode, the pump of the hydrostatic transmission may be operated continuously at a speed corresponding to the optimum electric-motor speed. In this case, the torque at the output shaft drops hyperbolically with increasing output-shaft speed. With a shunt-wound motor, according to the invention, the angular velocity can be compensatorily increased by amplifying the exciting field. With an angular velocity ratio of about 1:2, the efficiency is only affected slightly and it should be recognized that the current fraction necessary to generate the field is only about 5 percent or less than the total motor current.

The present invention is based upon the principle that, when low output speeds are required, e.g. when the vehicle driven by the output shaft is to move slowly, or when the load applied to the output shaft is small (partial loading), the speed of the electric motor is reduced. The electric motor, of course, is operated with full rotary speed when full load or full speed at the output shaft of the transmission is required and preferably at a point somewhat before full loading on the torque/speed characteristic of the hydrostatic transmission. Since the electric motor may be overloaded (i.e. caused to overheat), if it is operated at full speed and the hydrostatic load is increased, it is preferred to operate the motor at somewhat less than its full speed where at increased load may be applied by operating the stepless transmission. Preferably, the excitation of the field winding of the shunt-wound motor is effected in step with the displacement of the control member of the hydrostatic transmission so that higher electric-motor speeds are provided as the hydraulic demand upon the pump or the fluid volume generated thereby is increased.

Advantageously the electric motor is a pure shunt-wound motor, i.e. the only field coils are connected in shunt across the armature. In the past, vehicle drives have made use of compound-winding electric motors which, for the reasons stated previously, cannot be considered as effective for the present purposes. According to an important feature of the invention a control device is provided for regulating the excitation current of the field coil and a further control device is provided for regulating the output of the pump of the hydrostatic transmission and hence the output of the latter in a stepless manner, the two devices being effectively connected together so that a desired relationship can be maintained between the excitation current of the shunt winding and the transmission output at all times. Control of the excitation current may be effected by connecting the device provided for that purpose to a control lever for operating the entire drive system, e.g. a vehicle-speed control pedal so that, when the pedal is operated to effect a braking of the vehicle, the excitation current in the field is amplified, i.e. the excitation current is amplified when the pedal is released to reduce speed or brake the vehicle (thereby permitting the electric motor to act as a generator) so that the system is not simply shifted into a neutral mode in which the pump is free running.

This function can be obtained using a drag link with play and with friction or a spring whereby the pivot location shifts along the drag length. A device of this type may be employed to cut in the excitation-current increase after the hydrostatic transmission has been actuated in the manner described above. Lost motion and other linkages may also be employed.

When the arrangement is to be used for driving a load-lifting mechanism, the present invention provides that the field-excitation current will be emphasized when the control device or the lifting mechanism is shifted into its "lower" position. With a fork-lift vehicle the shunt wound electric motor can be used via the hydrostatic transmission to power the vehicle wheel and also to power a pump for the hydraulic jack or cylinder of the lifting fork. According to the present invention, the control arrangement for the lifting mechanism and the control arrangement for the vehicle drive are collectively or individually linked to an actuator for the field excitation current so that, with braking of the vehicle and/or lowering of the load on the lifting mechanism, the exciting field is increased. This increase in the exciting field permits even relatively small rotation speeds of the motor over the lowering load of the momentum of the vehicle to generate electrical energy which can be stored, for example, in the battery. The storage of this generated energy, which can be withdrawn from the battery during subsequent operation increases the useful life of a battery charge.

In normal usage the plant vehicle, e.g. the fork-lift vehicle described previously, is accelerated to relatively high speed rapidly and over relatively short distances, and is thereafter braked to a standstill or slow speed. The energy required to overcome the standing inertia of the vehicle is therefore relatively small by comparison with the energy required for acceleration by braking of the vehicle. During this later process, the stepless hydrostatic transmission also plays an important role since it can be set to operate the pump as a hydraulic motor at high speed and thus drive the generator (the shunt wound electric motor) at an optimum speed and recovery of the electric energy.

As noted previously, the hydrostatic transmission is provided with a control lever, e.g. a hand operated lever and a lifting mechanism and/or a pedal for controlling the speed of the vehicle, and this lever is connected to a circuit element for regulating the current through the shunt winding of the motor. This coupling is provided so that, as the output rotary speed of the transmission is reduced, the field excitation is emphasized. In this manner the reduction is efficiency of the hydrostatic transmission at low speeds is reduced since the input speed (of the hydrostatic pump) is reduced in step with the speed reduction of the hydrostatic motor. In fact, with a system of the type described, the reduction in efficiency of the hydrostatic transmission does not have any large effect on the overall drive characteristics since the absolute level of the energy withdrawn from the battery in this operating range is minimal. The total energy utilized by the transmission is thereby reduced by comparison with hydraulic drives powered by the constant-speed electric motors.

With fork lift vehicles having a direct-current shunt wound electric motor whose shaft is connected to the driven member of a hydrostatic pump and wherein the hydrostatic motor of the stepless transmission is connected to the vehicle wheels and in which the electric motor is also connected to a pump for the hydraulic lifting mechanism, it has been found to be advantageous to provide in series with the field coil, an adjustable resistor whose control element is operatively connected with the drive pedal of the vehicle and a further, preferably also adjustable, resistor whose control element is operative connected to the control valve for the hydraulic lifting mechanism and is not parallel to the first mentioned variable resistor. In this phase, even when the electric motor has been set at a low speed by the drive control pedal of the vehicle, it is possible by appropriate setting of the control lever for the hydraulic lift mechanism to bring the electric motor to a higher speed or even full speed so that the pump for the hydraulic lifting mechanism can be operated at full speed and high speed lifting is obtained.

Instead of the second variable resistor for control of the excitation field dependent upon the actuation of the lifting mechanism, it is possible to provide a switch in circuit with the exicting field coil which, upon operation of the control valve for the hydraulic lifting mechanism, switches a resistor into circuit with exciting coil whereby the reduction in the exciting field will produce the desired elevation in the rotary speed of the electric motor.

Instead of regulating the excitation current of the field by a variable resistor, we may provide, according to another feature of this invention, a transistor circuit which may simultaneously act as an amplifier. More generally, the collector-emitter network of the transistor may act as an electronically controlled resistor or may be connected across a resistor of constant value so as to constitute a variable-resistance shunt therefore. Conventional commercially available potentiometers, of course, may be used as the adjustable resistance.

Where the exciting field current is controlled by a resistor or an electronic circuit element functioning as a resistor, there is some energy loss by Joule heating across the resistor. This energy loss is relatively small by comparison with the total energy balance because only a small fraction of the electric motor current traverses the field coil and only a small portion of this fraction is subjected to the voltage drop in the resistor. It is, of course, possible to avoid even this loss by subdividing the field coil into a plurality of field-coil sections which may be cut in or out by switches serving as the exciting-current control element.

To cut off the electric motor in a standstill state of the vehicle and thereby prevent any need for operating the pumps of the hydrostatic or hydraulic transmissions in a free running mode, the invention provides that, as the drive pedal is returned to its neutral position, a switch is operated to cut off the electric motor. This switch may be in series with the armature of the electric motor across the pedal. When the electric motor is intended to drive not only the hydrostatic transmission for vehicle travel but also the pump for the hydraulic lifting mechanism, this switch is operatively connected to the pedal and to the actuating system for the lifting mechanism so that it cuts off the electric motor only when both are in the "off" or neutral positions.

According to another feature of the invention there is provided a time-delay element in the operative connection between the drive pedal, the lifting-mechanism actuator, any other hydraulic device driven by the motor, or all of them, and the electric motor and the switch of the electric motor so that the latter is not cut off during momentary standstill of the hydraulically operated systems.

Advantageously, the vehicle drive comprises a pair of driven wheels each operatively connected to a hydrostatic motor which communicates with a single variable-displacement pump driven by the shunt wound electric motor. Between the pump and the drive hydraulic motors, there is provided a hydro motor which is connected with the steering linkage of the vehicle and serves to proportion the hydraulic fluid betwen the drive motors in accordance with the degree and direction of steering so that a differential displacement of the hydraulic motors is effected to compensate for the greater speed necessary along the outer rim of the curve. A proportioning valve may, of course, also be provided for this purpose and can be connected to the steering linkage.

DESCRIPTION OF THE DRAWING

The above and other objects, features and advantages of the present invention will become more readily apparent from the following description, reference being made to the accompanying drawing in which.

SPECIFIC DESCRIPTION

Figure 1:
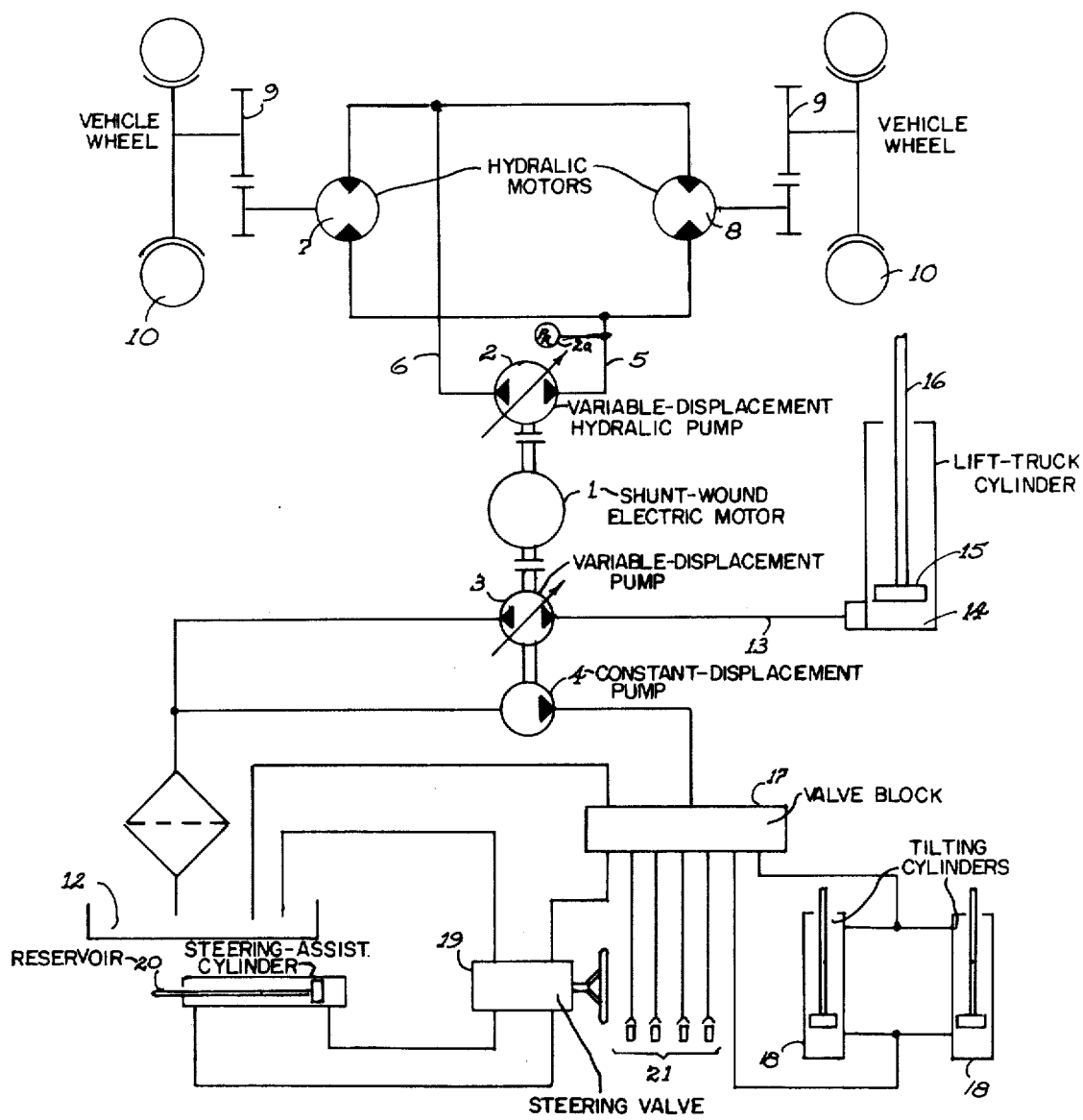
FIG. 1 is a hydraulic circuit diagram illustrating a drive system for a fork-lift vehicle using a hydrostatic transmission to drive the vehicle wheels and having a pump for operating a hydraulic lift mechanism and other systems.

In FIG. 1 of the drawing we show a system for a fork-lift truck or the like embodying the present invention, the truck having a hydrostatic drive for the vehicle wheels and a hydraulic lifting system or jack for the fork mechanism. The system is also applicable to other vehicle arrangements in which the vehicle wheels or some other structure is powered by hydrostatic motors and the latter are controlled through or supplied by a hydrostatic pump.

Figure 2:
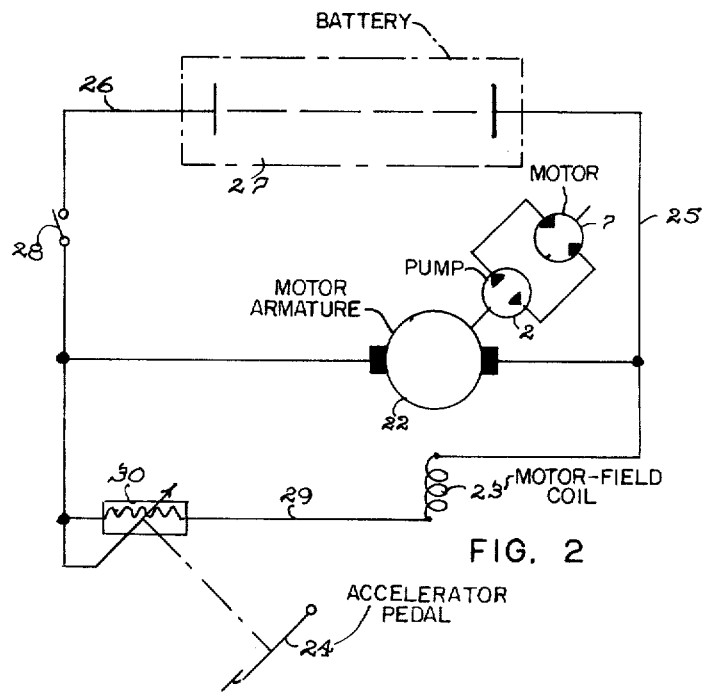
FIG. 2 is an electrical circuit diagram showing one arrangement for controlling the exciting field of the shunt wound electric motor of FIG. 1.

In the diagram of FIG. 1, a shunt-wound electric motor 1 (energized from the battery of the vehicle as illustrated, for example, in FIG. 2) is connected to a variable-displacement hydraulic pump 2, which preferably is of the axial-piston type. In a pump of this type, the shaft (from the electric motor 1) is connected to a cylinder drum of barrel which is rotated to sweep a plurality of angularly equispaced pistons along an inclined control surface so that each piston is alternately urged inwardly or permitted to move outwardly with respect to a fluid distribution surface against which the cylinder is pressed. This surface may be provided with a pair of arcuate ports through which fluid is forced by the pistons and constituting the high pressure side of the pump or from which the fluid is drawn into the individual cylinder ports of the drum or barrel at the low pressure side of the pump. Such pumps are reversible in the sense that an increase in the pressure of the fluid returned to the pump will apply a torque to the shaft and the pump is also reversible in the sense that the high pressure port can be transformed into a low pressure port or vice versa simply by swinging the inclined surface about an axis perpendicular to the axis of rotation of the drum. Furthermore, when fluid is forced through this pump, a torque is provided at its shaft so that the pump can act as a hydraulic motor.

The pump 2 is connected by hydraulic lines 5 and 6 to a pair of parallel-connected hydraulic motors 7 and 8 which may be of the axial-piston type as well, but in which the angle of inclination of the plate against which the pistons rack is not necessarily adjustable. The output shaft of each motor is connected by a mechanical transmission, here shown as a pinion rotating a driven gear, to the wheels 10 of the vehicle. When the fluid supply to the motor is insufficient and the momentum of the vehicle drives the motors, they function as hydraulic pumps to force fluid to the pump which may be functioning as a hydraulic motor.

The shaft of the electric motor 1 is also connected to a variable-displacement hydrostatic pump 3 similar in construction to the pump 2, and connected via a line 13 to a hydraulic lifting mechanism 14-16 operating the fork of the vehicle. The lifting mechanism comprises a cylinder 14, a piston 15, vertically shiftable within the cylinder, and a piston rod 16 connecting this piston to the load formed by the fork or rack of the vehicle.

Another pump 4 of the constant-displacement type is connected to the electric-motor shaft as well.

The pump 3 draws hydraulic fluid via line 11 from a reservoir 12 and forces it into the cylinder 14 via line 13 behind the piston 15 to lift the latter piston and raise the fork. Of course, when the torque applied by the motor 1 is reduced, the load upon the rod 16 will force hydraulic fluid in the opposite direction through line 13 and a pump 3, thereby operating the pump as a motor, as the fluid flows via line 11 back into the reservoir 12. The energy of the returning fluid is thereby transferred to the shaft of the electric motor 1 which may operate in a generator mode to reconvert mechanical energy to electrical energy which can be used to recharge the battery.

To brake the fork-lift vehicle, the pump 2 is shifted into a position representing a reduced driving speed, whereupon the pump supplies a smaller quantity of hydraulic fluid than that which is displaced by the motors 7 and 8. The latter thus act as pumps to drive the pump 2 and apply torque via this pump to the shaft of the electric motor. Motors 7 and 8 thus act as mechanical-hydraulic transducers while pump 2 and motor 1 together form an hydraulic-electric transducer within the meaning of the present invention. Motor 1 operates as a generator in this mode and supplies electrical energy to the battery.

The constant displacement of pump 4 draws fluid from reservoir 12 and supplied it under pressure to a valve block 17 which controls a pair of tilting cylinders 18 whereby the fork or rack of the fork-lifted vehicle are shifted out of the vertical plane. This pump also supplies, via the valve block 17, a power-steering arrangement which is shown to comprise a servovalve 19 connected to the steering wheel and a steering-assist cylinder 20 whose piston is connected to the steering linkage. Connectors 21, which may be of the self-closing type, may be used to connect auxiliary hydraulic systems to the arrangement disclosed.

In FIG. 2 we have shown a circuit for the motor 1 of FIG. 1. In this system, the armature 22 of the motor is shown to be connected to the pump 2 which, in turn, is tied to the motor. The field coil 23, in shunt with the armature, is connected via a line 29 to a variable resistor 30 in series with the battery 27. An accelerator pedal is provided for controlling advance of the vehicle. This pedal may be mechanically connected to the tilting plate of the hydrostatic pump 2 by any conventional linkage so that, for forward movement, the plate is tilted so that fluid is displaced to the hydraulic motors 7 and 8 to drive the same in one direction. The speed is controlled by this pedal since the displacement of this pump is a function of the degree to which the pedal is depressed.

The motor 22/23 is connected by conductors 25 and 26 to the terminals of a battery 27 via a switch 28 which, moreover, is connected to the accelerator pedal 24 so that, when the vehicle is brought to standstill, switch 28 is opened and the motor 22/23 de-energized whereby the pumps of the hydrostatic drive are turned off. In conductor 29 for the field coil 23 of electric motor 22/23, there is provided the variable resistance 30 mentioned earlier whose ohmic resistance is a function of the position of the pedal 24. At low speeds, the resistance 30 is cut out or is of only limited resistance value, and with increasing vehicle speed, resistance 30 is cut in or rendered increasingly effective so that with acceleration of the vehicle to optimum speed, resistor 30 is fully in circuit and the motor 22/23 is at its highest rotary speed. Further increases in vehicle speed are then effected exclusively via the hydrostatic drive.

Figure 3:
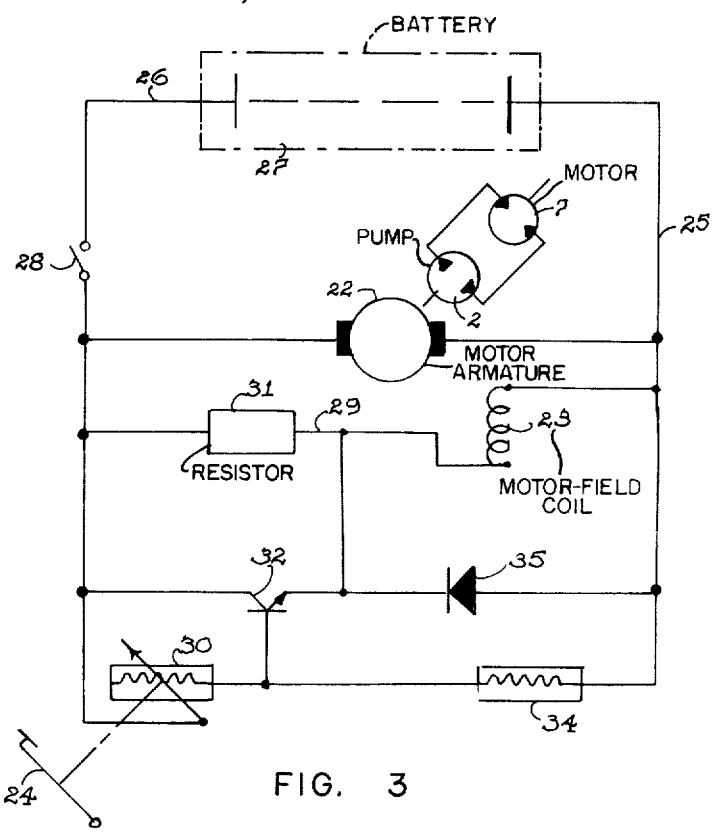
FIG. 3 is a circuit diagram employing a transistor amplifier and likewise adapted to control the shunt wound electric motor of FIG. 1.

The circuit shown in FIG. 3 differs from that of FIG. 2 by providing a nonadjustable resistor 31 in series with the coil 23 across the battery 27 in series with the switch 28. This resistor 31 is shunted by the collector-emitter network of a transistor 32 whose base level is controlled by a voltage divider formed by a resistor 34 in series with the variable resistor 30 across the battery 27. When the pedal 24 is depressed for increasing acceleration, therefore, the resistor 30 undergoes a change in its effective ohmic value to render the transistor 32 effective to reduce the shunt effect and thereby increase the effective ohmic resistance in series with coil 23.

In other words, when the transistor 32 is fully conductive (across its collector-emitter network), the resistor 31 is fully shunted and zero resistance appears in series with the field coil 23 whereby the full battery potential is applied thereacross and the motor 22/23 is thus driven at reduced speed.

With increasing displacement of the pedal 24 to correspond to increasing vehicle speed, resistor 33 is adjusted to reduce the conductivity of transistor 32 (across its collector-emitter network) so that the effective resistance in series with the field winding 23 approaches that of the resistor 31, the field being weakened until the transistor 32 is completely blocked such that the entire excitation current must flow through the resistor 31. The diode 35 connected across the field coil 23 serves only to permit the current induced in the field coil 23 at cutoff of the motor to drain.

Figure 4:
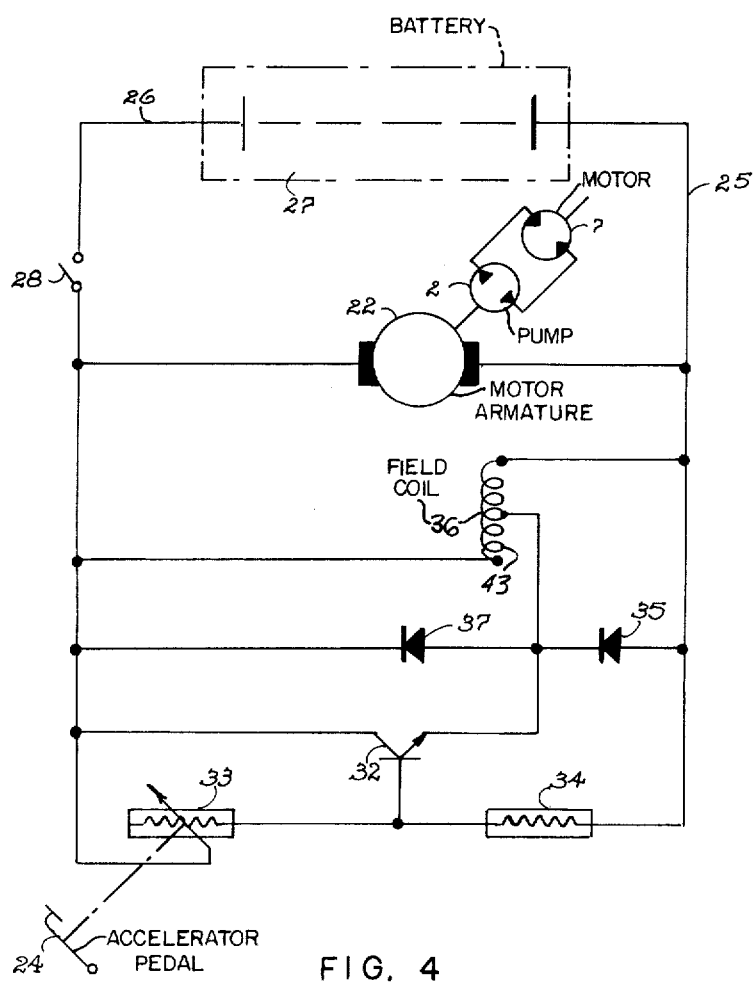
FIG. 4 is a circuit diagram of a system utilizing a transistor amplifier and split shunt winding for controlling the electric motor of FIG. 1.

Reduced losses can be obtained with the circuit illustrated in FIG. 4 in which the field coil is subdivided or tapped to produce a pair of field coils 36, 43. In this circuitry the armature 22 is connected across the battery 27 in series with the switch 28 as previously described and is also connected to drive the pump of the hydrostatic system illustrated in FIG. 1, as shown for the pump 2 and its motor 7 in FIG. 4. The two sections 36, 43 of the field coil are connected in series across the battery 27 and hence across the armature winding while a tap between the two field coil sections is connected between a pair of diodes 35, 37, poled in the same direction. A voltage divider 33, 34, similar to the voltage divider of FIG. 3, is connected across the battery 27 and is tapped to the base of a transistor 32 whose collector-emitter network ties the tap between the coil sections 36, 43 to one terminal of the battery 27. When the vehicle is started, the resistor 33 is fully effective so that the maximum potential is applied to the base of transistor 32 and a current is permitted to flow through the collector-emitter network thereof. Since the transistor 32 has its collector-emitter network in parallel with the coil section 43 and in series with the field-coil section 36, an amplification occurs and there is a corresponding reduction in the rotary speed of the shunt-wound electric motor. As the resistance of the resistor 33 increases, the potential between the base and emitter of collector 32 decreases and the collector current is likewise decreased. As a result of the weakening of the fields of the coil sections 36 and 43, the rotary speed of the motor is increased. To minimize the current through the control resistor 33, a multi-stage transistor amplifier may be used.

The circuit shown in FIG. 3 for control of the shunt-wound electric motor 22, 23 of FIG. 1 comprises a nonadjustable (constant-value) resistor 31 in the conductor 29 and in series with the field-excitation winding 23 and makes possible the control of the electric motor with still lower losses as compared with the circuit of FIG. 2. The emodiment of FIG. 3 makes use of circuit elements which have already been described in connection with FIG. 2 and function identically therewith, i.e. the circuit elements 22 - 29.

The resistor 31, although nonvariable, is connected in parallel with the variable- resistance stretch of an emitter-collector network of a transistor 32 whose base bias or potential is tapped from across the battery 27 by a voltage divider having a controllable (variable) resistor 30 which may be a potentiometer (FIG. 9) connected with a control lever.

More particularly, the base of transistor 32 is connected to the junction between a variable resistor 30 coupled to the vehicle drive pedal 24 and in series with the constant-value resistor 34 across the battery 27.

The transistor 32, when fully conductive, short-circuits the resistor 31 by reason of the low ohmic value of its emitter-collector path, so that full potential is applied across the field winding 23 and the electric motor 22, 23 is driven with reduced speed.

When the vehicle drive pedal 24 is depressed to increase the vehicle speed, the potentiometer 30 is actuated so that the conductivity of the emitter-collector network of transistor 32 decreases, a greater voltage drop appears across the resistor 31, and the voltage across the field-excitation winding 23 is reduced and its field weakened until the transistor is fully blocking or nonconductive and the total field-excitation current must pass through the resistor 31. Under these circumstances, the electric motor 22, 23 attains maximum speed.

The diode 35 plays a protective role and serves only to drain current arising from the inductivity remanent in the system when the motor is switched off, e.g. by switch 28. Further increases of speed may be effected by the depression of the pedal 24 after the electric motor has attained maximum speed, via the mechanical coupling of the control lever formed by the pedal to the tiltable control plate of the axial piston pump 2.

Yet further reduction in the electrical losses and hence further increase in the available electric power at the battery can be obtained with the system illustrated in FIG. 4 wherein elements which are functionally identical to those of FIGS. 1, 2 and 3 have identical reference numerals. In this embodiment of the system, however, the field-excitation coil connected in shunt across (or in parallel with) the armature 22 to the battery 27 in series with the switch 28, is tapped to provide two winding sections 36 and 43. Here the latter winding section replaces the series resistor 30 or 31 of the previous embodiments.

The collector-emitter network of transistor 32 is bridged across the winding section 43 while the base of transistor 32 is connected to a voltage divider formed by potentiometer 33 and fixed resistor 34 (connected in series across the battery 27). The transistor networks of FIGS. 3 and 4 permit the resistance values of the fixed resistors 34 to be substantially higher than the value of resistor 30 so that only a small power loss is obtained in the voltage divider. Since the power loss in the transistor is negligible, the circuit of FIGS. 3 and 4 are electrically more efficient than that of FIG. 2.

Figure 9:
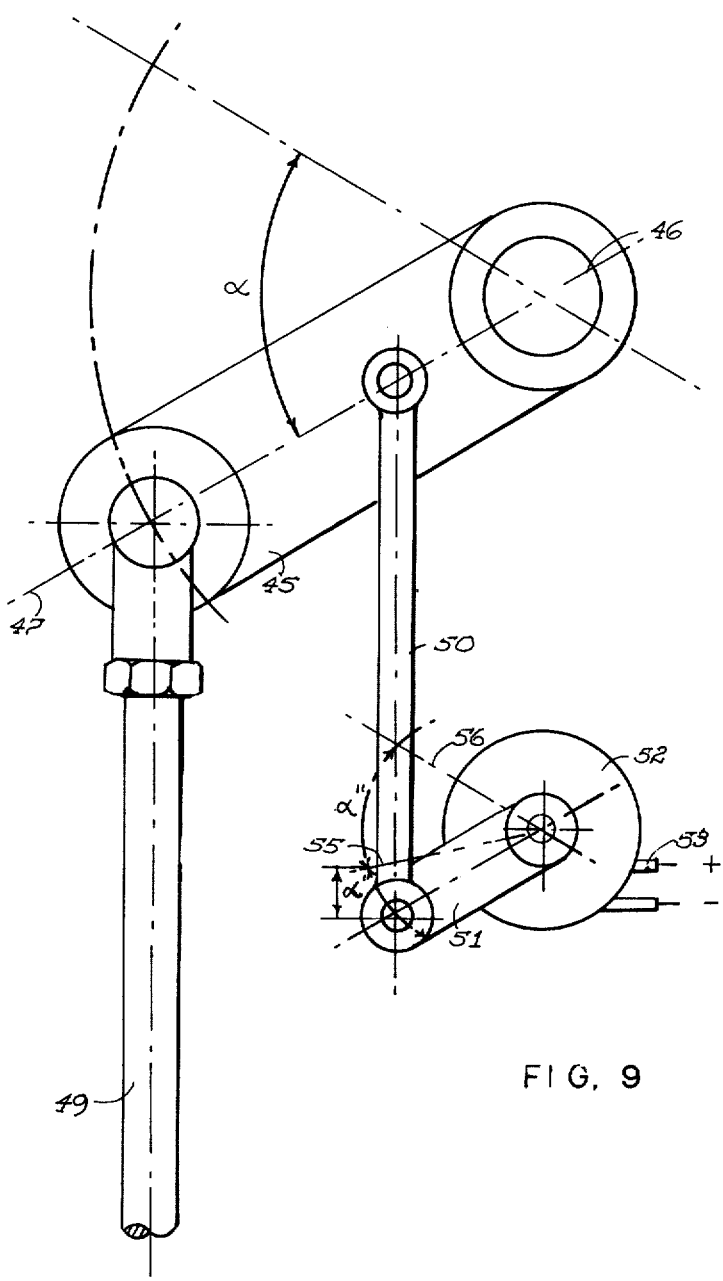
FIG. 9 is a diagram illustrating a control mechanism for the hydrostatic and electrical elements according to the present invention.

The potentiometer 33 is connected to the vehicle drive lever (pedal 24), e.g. as shown in FIG. 9. Diode 35 is bridged across the winding section 36 and serves to drain the latter upon cutoff of the motor while a similarly functioning diode 37 is bridged across the winding section 43.

Upon turning on the motor 22, 36, 43 (which drives a hydrostatic transmission as described in connection with FIG. 1), the setting potentiometer initially has zero resistance value, i.e. is fully conductive, so that corresponding to the high voltage at the base of transistor 32, a large current flows through the collector-emitter network. Since the transistor emitter-collector network of the transistor 32 is in parallel with the winding section 43, the latter is essentially short-circuited and a high current traverses the winding section 36 to produce a relatively high field and maintain a low rotary speed of the motor, as previously described.

Should the potentiometer 33 be actuated by depression of the vehicle speed pedal 24 in such manner that its effective resistance increases, the emitter-base voltage of the transistor 32 drops so that the effective resistance of its emitter-collector network increases and the current therethrough is reduced correspondingly. The field is thereby reduced and the rotary speed of the electric motor 22, 36, 43 increases. Of course, a multi-stage transistor amplifier (FIG. 8) may be used to further diminish the current through the setting potentiometer 33 and limit power losses to a still greater extent.

Figure 5:
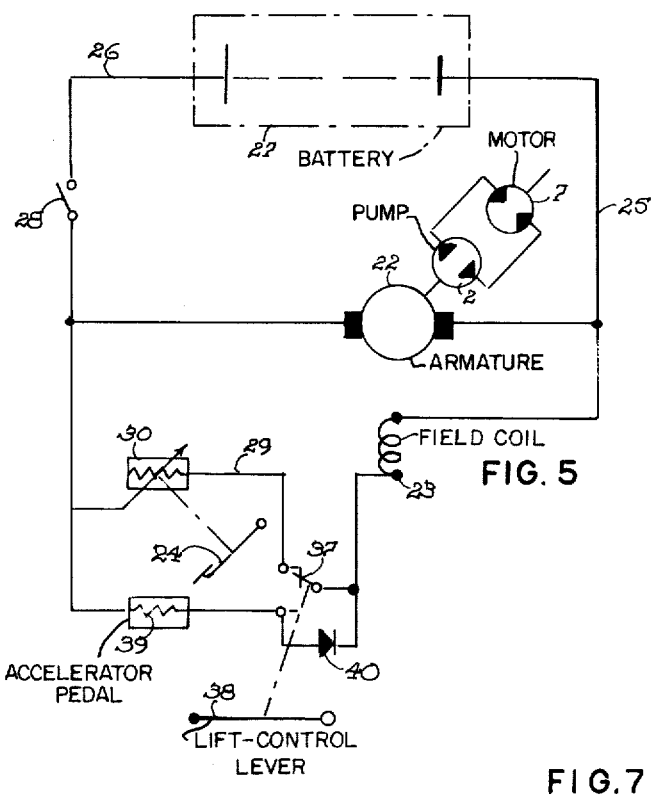
FIG. 5 is an electric circuit diagram of still another arrangement for controlling the electric motor of FIG. 1.

FIG. 5 shows another embodiment of the invention which is a variant of the circuit of FIG. 2 and in which similar elements have similar reference numerals. In this embodiment, especially designed for a lift vehicle, e.g. a fork-lift truck using the hydraulic circuits of FIG. 1, the hydrostatic transmission 2, 7, is controlled by a drive pedal 24 and the electric motor 22, 23 not only serves to drive the hydrostatic transmission 2, 7, but also drives the pump for the hydraulic lifting mechanism shown in FIG. 1. Elements 22 – 30 are functionally identical to the corresponding elements of FIG. 2.

A switch 37 is here provided in operative connection with a lift-control lever 38 which operates a control valve (not seen in FIGS. 1 and 5 but represented at 100 in FIG. 8) or the control plate of an axial-piston pump to actuate the hydraulic lifting mechanism (14 – 16 in FIG. 1). The position of switch 37 shown in FIG. 5 corresponds to the circuit illustrated in FIG. 2.

When the drive pedal 24 is set to a low-vehicle speed and the resistor 30 is substantially fully conductive, the field-excitation winding 23 is traversed by a strong electric current and the rotary speed of the electric motor 22, 23 is held low.

If, during this operating mode, it is desired to actuate the hydraulic lifting mechanism at full electric-motor speed, the control lever 38 is shifted to reverse the position of switch 37 and connect the resistor 39 in series with the field-excitation winding 23, thereby decreasing the field excitation current and causing the electric motor 22, 23 to operate at high speed. Of course, the resistor 39 may be a potentiometer coupled with the lever 38 where speed-control of the lifting mechanism analogous to that obtained with the pedal 24 is desired.

The diode 30 prevents interruption of the current during switching of switch 37 from drive-pedal control to control-lever response. The diode 40, which connects the resistor 39 to the winding 23 in all positions of the switch 37, lies in parallel (with the resistor 39) to the resistor 30, in the switch position shown in FIG. 5. When the resistors 30, 39 have approximately the same value, the overall resistance of the parallel network must be taken into consideration although the resistor 39 can be ignored generally when resistor 30 has a substantially lower value.

Figure 6:
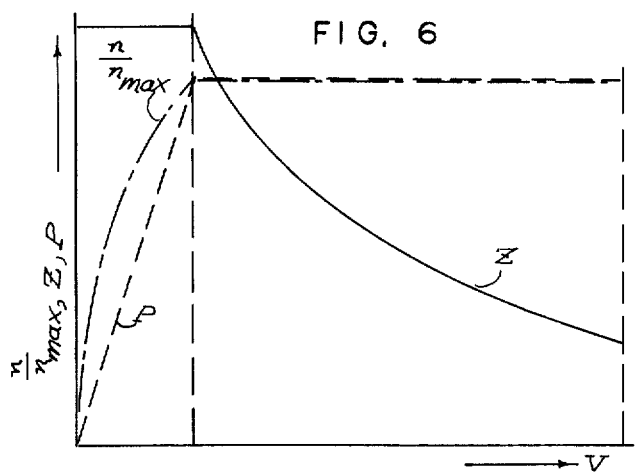
FIG. 6 is an explanatory diagram in which the hydrostatic transmission characteristics are plotted.

FIG. 6 shows the operating characteristics of a system according to the invention and especially is variable to indicate the two operating stages. In FIG. 6 the velocity is plotted along the abscissa (V) while the tractive force (Z) of the vehicle wheels is plotted along the ordinate. The tractive force Z is shown in solid lines and is substantially constant (over the horizontal portion of the curve Z) from standstill of the vehicle to the point at which the pressure-relief valve of the hydrostatic transmission (e.g. the valve 2a in FIG. 1) limits the hydraulic pressure applied to the motors 7 and 8. When the pressure-relief valve becomes effective, the tractive force falls with increasing velocity along the hyperbolic portion of the curve shown in FIG. 6. The dashed line $p$ represents the work done by the transmission. In the region in which the tractive force is constant, the work done or power increases substantially linearly with the driving rotary speed. In the region in which the tractive force falls hyperbolically, the available driving power remains constant. The dot-dash line represents the ratio of the rotary speed $n$ of the electric motor to the maximum value $n$ max and increases to a point corresponding to the maximum tractive force. At this point, in which the power consumption is substantially constant, it is maintained at a maximum value whereby the vehicle speed can only be altered by adjustment of the hydrostatic transmission.

Figure 7:
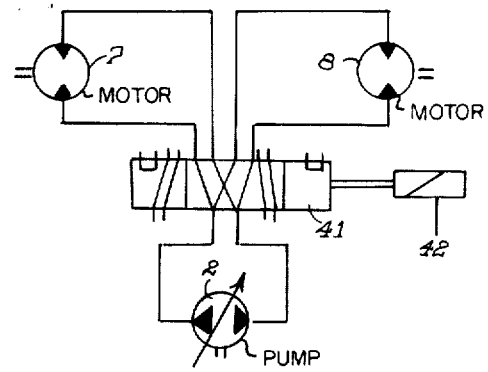
FIG. 7 is a diagram illustrating a steering-linked proportioning control for the drive motors of FIG. 1.

In FIG. 7, we have shown a hydraulic circuit arrangement which is intended to be used in the system of FIG. 1 and in which the hydraulic pump 2 and the two hydraulic motors 7 and 8 are connected via a six/two port, three-position valve 41 operated by an electromagnet system 42 from the steering linkage of the vehicle. In the position shown in FIG. 7, the hydraulic motors 7 and 8 operate normally to provide tractive force at both of the vehicle wheels in accordance with the principles set forth in FIGS. 1 through 6. For a right hand turn, however, differential action is required between the driving wheels and hence the electromagnetic arrangement 42, tripped by the steering linkage, shifts the valve 41 to block flow of fluid from the pump 2 to the motor 8 while permitting fluid to flow to the motor 7 driving the wheels at the outer limb of the curve. When the vehicle is to turn in the other direction, motor 7 is connected in a closed circuit but separated from the pump 2 while hydraulic fluid is permitted to flow to motor 8 from this pump, the valve 41 being in its extreme right hand position. Thus the drive motor at the inner limb of the curve is permitted to idle while the drive motor at the outer limb is fully powered and a differential action is engendered.

Figure 8:
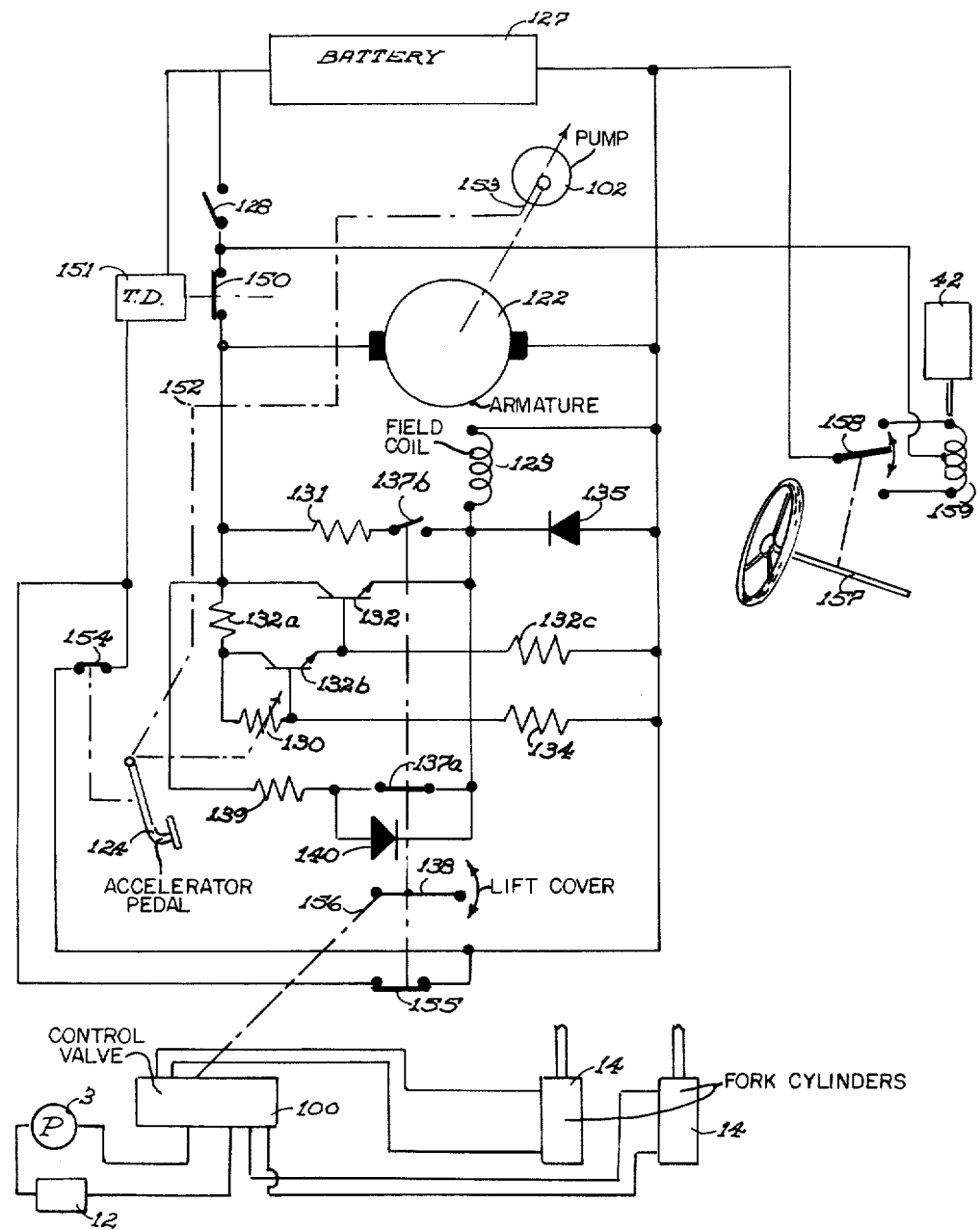
FIG. 8 is a modification of the device of FIG. 7.

In FIG. 8 we have shown still another modification of the circuit of FIG. 1 according to the invention and, in this embodiment, the battery 127 is connected across the armature 122 of a motor 122, 123 by an on-off switch 128 and a further switch 150 operated by a time-delay relay 151 as will be described in greater detail hereinafter. A fixed-value resistor 131 is connected in series with a field coil 123 of the motor across the armature 122 and the battery 127 while a transistor 132 has its emitter-collector network connected in shunt with the resistor 131. A bias resistor 132a is provided in ciruit with the emitter-collector network of a shunt transistor 132b of the multistage amplifier to provide the proper input at the base of transistor 132. Transistor 132b has its base connected between a potentiometer 130 and a fixed-value resistor 134 across the battery 127.

The wiper pedal 124 which, as illustrated, is tied by a linkage 152 to the control member 153 of the variable-displacement pump 102 of the hydrostatic transmission, is identical to pedals 24. The pump 102 may operate hydraulic motors as shown at 7 and 8 in FIG. 1.

A diode 135 is connected across the field-excitation winding 123 to drain the system when the motor is cut off while a bias resistor 132c is connected between the base of transistor 132 and the battery.

In addition, the circuit includes a switch 154 which is closed upon release of the pedal 124 to operate a switch 150 with a time-delay determined by the setting of relay 151 so that the electric motor is cut off only after a lag of a control period (e.g. on the order of tens of seconds) but will not be cut off immediately upon release of the pedal. This has the advantage of preventing start-drop operation of the electric motor each time the pedal is released for a brief interval during use.

The hydraulic lift of the vehicle is operated by the lever 138 which is connectd to a pair of switch contacts 137a, 137b which functions as described for the switch 37 in FIG. 5, a diode 140 being connected in series with the resistor 139. A further contact 155 serves to cut off the electric motor via a delay relay 151 should the lever be released and the vehicle at a standstill. The lever 138 is shown to be coupled at 156 to a control valve 100 interposed between a pump 3 driven by the motor 122 to feed fluid from a reservoir 12 to a pair of hydraulic cylinders 14 for raising and lowering the fork.

The steering system 157 is shown to be provided with a switch 158 selectively operating the halves of a coil 159 to displace the valve 42 to either side of the central position shown in FIG. 7 to obtain differential action at the wheel. Of course, the system of FIG. 8 operates identically to that previously described except in the respect already described.

FIG. 9 shows a linkage arrangement between a control lever and a resistor or potentiometer according to the invention. In FIG. 9, the lever 45 is rigid with a shaft 46 which can be connected by means not shown to the tiltable control plate of the axial piston pump previously described in connection with FIGS. 1 and 8. In the position illustrated, the lever 45 has an axis 47 intersecting the axis of shaft 46 and corresponding to the position of the control lever in the neutral state, i.e. operation of the pump does not displace fluid through the remainder of the hydraulic circuit. When the lever is shifted into the position illustrated by the dot-dash line 48, the pump is in its maximum delivery condition, i.e. the pistons perform the greatest excursion and the stroke volume per revolution is at its highest.

The lever 45 is connected by an articulated link 29 to the drive pedal 24, 124 of the vehicle. A further articulated link 50 connects the lever 45 with an arm 51 mounted on the spindle of a rotary potentiometer 52 which is connected via its terminals 53 and 54 directly or indirectly to the field coil of the shunt wound electric motor. The potentiometer 52 may thus be the variable resistor 30, 33 or 130 illustrated in FIGS. 2 through 5 and 8.

When the lever 45 is shifted into its dot-dash position through the total adjustment angle $\alpha$ the arm 51 is swung through a corresponding angle $\alpha'$ in which the resistance value is altered so that a decreased current flows through the field excitation coils and the electric motor speed is raised as described. When the lever reaches the point 55 the resistor 52 is at full value and further angular displacement of lever 45 through the angle $\alpha''$ ($\alpha = \alpha' + \alpha''$) does not vary the resistance but permits the pump to be increasingly effective. Of course, where the pump is of the reversible type a symmetrical displacement on the other side of the neutral position represented in FIG. 9 must be provided.

We claim:

1. A drive system comprising, in combination a storage battery; a shunt-wound electric motor having a field-excitation coil connected in shunt with an armature across said battery; a stepless variable hydraulic transmission including a hydraulic pump drivingly connected to said electric motor and a hydraulic motor operatively connected to a load and in fluid communication with said pump; and control means for varying the excitation current of said field coil, said transmission comprising a transmission control element for varying the speed ratio between said pump and said hydraulic motor, said control means for varying the current through said field coil including a current-control element for joint and simultaneous regulation of the current through said field coil and said ratio in a predetermined relationship to minimize battery drain.

2. The drive system defined in claim 1 for a vehicle wherein said transmission is connected to the driving wheels thereof and said vehicle has a drive-control element operatively connected to said transmission-control element and to said current-control element.

3. The drive system defined in claim 2 wherein said electric motor is a pure shunt-wound motor having no excitation coil apart from the aforementioned field coil connected in shunt with said armature.

4. The drive system defined in claim 2 wherein said drive-control element is a pedal operatively connected to said current-control element for increasing the excitation field with reduction in the output speed of said hydraulic motor.

5. The drive system defined in claim 4 wherein said vehicle is provided with a hydraulic lifting mechanism having a pump connected to said shunt-wound electric motor and a lifting-control element for regulating the supply of fluid to said mechanism, said lifting-control element being operatively connected to said current-control element for increasing the excitation field upon lowering of said mechanism.

6. The drive system defined in claim 1 wherein said elements are so connected and arranged that with decreasing output speed of said electric motor, the excitation field is increased.

7. The drive system defined in claim 1 wherein said transmission is a hydraulic lifting mechanism provided with a lifting-control element, said means for controlling said current including a current-control element operatively connected to said lifting control element for increasing the excitation field of said coil upon lowering of said mechanism.

8. The drive system defined in claim 1 wherein said means for controlling said current includes a variable resistance network in series with said coil and a current-control element for varying the resistance of said network, said transmission being provided with a control element operatively connected to said control element of said network.

9. The drive system defined in claim 8 wherein said network is a variable resistor having a wiper and said control element of said transmission is a lever operatively connected to said wiper.

10. The drive system defined in claim 8 wherein said network is the collector-emitter network of a transistor and said current-control element includes means for biasing said transistor.

11. The drive system defined in claim 8 wherein said network includes a resistor of substantially fixed resistance connected in series with said coil, a transistor having a collector-emitter network bridged across said resistor, and means for controlling the bias on said transistor.

12. The drive system defined in claim 11, further comprising a diode bridged across said coil in series with said collector-emitter network.

13. The drive system defined in claim 8 wherein said network includes a plurality of resistors and switch means selectively connecting one of said resistors in series with said coil.

14. The drive system defined in claim 8 wherein said network includes a further field coil connectable in series with the first-mentioned field coil, said field coils together forming sections of a tapped field coil.

15. The drive system defined in claim 14 wherein said network further comprises a transistor having its collector-emitter network connected in shunt across one of said sections, and means for controlling the bias on said transistor.

16. The drive system defined in claim 8, further comprising a transistor amplifier between said element and said network.

17. The drive system defined in claim 1 for a fork-lift vehicle wherein said hydraulic motor is connected to a driving wheel of the vehicle, further comprising a switch in circuit with said electric motor and operatively connected to said transmission-control element for electrically disconnecting said electric motor upon movement of said transmission-control element into a neutral position of said hydraulic transmission.

18. The drive system defined in claim 17, further comprising a time-delay device interposed between said transmission control element and said switch for operating said switch only upon the disposition of said transmission control element into the neutral position for a predetermined time period.

19. The drive system defined in claim 1 wherein said hydraulic transmission is a hydrostatic transmission, said hydraulic pump is an axial-piston pump and said hydraulic motor is an axial-piston motor.

20. The drive system defined in claim 1 for a vehicle having a pair of driven wheels on opposite sides thereof, said transmission including a respective hydraulic motor drivingly connected to each of said wheels, said vehicle being further provided with a steering linkage, said drive system further comprising a valve between said pump and each of said hydraulic motors for distributing fluid between them in response to operation of said steering linkage to permit differential rotation of said wheels.

21. The drive system defined in claim 1 for a fork-lift vehicle having driven wheels connected to said hydraulic motor, a further hydraulic pump connected to said electric motor, a hydraulic lifting mechanism communicating with said further pump, a lift-control lever for regulating the flow of fluid from said further pump to said mechanism, and a switch in circuit with said battery and said electric motor and operatively connected to said lever for open-circuiting said switch upon displacement of said lever into an "off" position of said mechanism.

22. The drive system defined in claim 21, further comprising a time-delay device between said switch and said lever for open-circuiting said switch only after a predetermined period subsequent to the disposition of said lever in said off position.

* * * * *